United States Patent
Imada (10) Patent No.: US 7,430,367 B2
(45) Date of Patent: Sep. 30, 2008

(54) IMAGE PICKUP APPARATUS, CAMERA MAIN BODY THEREOF AND INTERCHANGEABLE LENS

(75) Inventor: Shinji Imada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 11/342,223

(22) Filed: Jan. 27, 2006

(65) Prior Publication Data

US 2006/0165398 A1    Jul. 27, 2006

(30) Foreign Application Priority Data

Jan. 27, 2005   (JP)   ............................. 2005-019976

(51) Int. Cl.
*G03B 17/00*   (2006.01)
*H04N 5/228*   (2006.01)

(52) U.S. Cl. ........................... 396/55; 396/52; 396/421; 348/208.99; 348/208.1; 348/208.2; 348/208.4

(58) Field of Classification Search .................... 396/55
See application file for complete search history.

(56) References Cited

U.S. PATENT DOCUMENTS

| | | | |
|---|---|---|---|
| 5,794,078 A | 8/1998 | Okazaki | |
| 6,047,133 A | 4/2000 | Washisu et al. | |
| 6,501,503 B2 * | 12/2002 | Kudo | 348/208.99 |

FOREIGN PATENT DOCUMENTS

| | | |
|---|---|---|
| JP | 3-46642 | 2/1991 |
| JP | 7-218967 | 8/1995 |
| JP | 9-80523 | 3/1997 |

* cited by examiner

*Primary Examiner*—Patrick Assouad
*Assistant Examiner*—Autumn Parker
(74) *Attorney, Agent, or Firm*—Morgan & Finnegan, LLP (57) ABSTRACT

The present invention provides a camera system which is provided with signal processing control means for changing the filter characteristic of parallel vibration signal processing means in conformity with the output signal of rotation vibration signal processing means and thereby can photograph an image suffering little from blur even during macro-photographing.

12 Claims, 10 Drawing Sheets

PRIOR ART

FIG. 9B

PRIOR ART

FIG. 10

IMAGE PICKUP APPARATUS, CAMERA MAIN BODY THEREOF AND INTERCHANGEABLE LENS

BACKGROUND OF THE INVENTION

1. Field of the Invention

This invention relates to an image pickup apparatus which corrects hand shake to thereby improve the accuracy of a picked-up image, the camera main body thereof and an interchangeable lens.

Particularly it relates to an image pickup apparatus which achieves an improvement in correcting performance for hand shake, the camera main body thereof and an interchangeable lens.

2. Related Background Art

In the present day cameras, operations important to photographing such as exposure determination and focusing are all automated and the possibility that even a person unskilled in camera operation causes failure in photographing has become very rare.

Also, recently, a system for preventing a hand shake applied to a camera has also been studied, and factors inducing a photographer's error in photographing has become almost null.

An image stabilizer system for preventing hand shake will be briefly described here.

The hand shake of a camera during photographing is usually a vibration of a frequency of 1 Hz to 10 Hz. To enable a photograph free of image blur to be taken even if such a hand shake is present at the point of time of exposure, it is necessary to detect the vibration of the camera due to the hand shake, and displace a correction lens in a plane orthogonal to the optical axis thereof in conformity with the result of this detection (optical image stabilizer system).

That is, to take a photograph free of image blur even if the vibration of the camera occurs, firstly, it becomes necessary to accurately detect the vibration of the camera, and secondly, to correct a change in the optical axis due to a hand shake.

The correction of image blur is effected by detecting the vibration of the camera by an angular velocity sensor or the like, and driving a correcting optical apparatus for making the photographing optical axis eccentric on the basis of the detected information of the vibration of the camera (see, for example, Japanese Patent Application Laid-open No. H07-218967).

Also, in order to improve the accuracy of the correction of image blur during close-up photographing in which the photographing distance is short, there has been proposed an apparatus which carries an acceleration sensor and an angular velocity sensor thereon, and detects not only rotation vibration, but also parallel vibration and corrects the both vibrations (see, for example, Japanese Patent Application Laid-open No. H03-46642).

Also, when the acceleration sensor is used, there may occur an error arising from the detection of parallel vibration due to the influence of gravity acceleration. Therefore, there has also been proposed an apparatus which calculates the coordinate conversion matrix of a stationary coordinates system and a camera coordinates system from the signal of a six-axis sensor (the acceleration of XYZ axes and an angular velocity about each axis), and eliminates the influence of the gravity acceleration (see, for example, Japanese Patent Application Laid-open No. H09-80523).

In a case where as disclosed in Japanese Patent Application Laid-open No. H09-80523, the six-axis sensor is used to effect posture calculation and effect the elimination of the gravity acceleration component of the acceleration sensor, the construction becomes complicated.

It results in the necessity of the larger scale and increased cost of the system, and a high-speed calculation processing system.

As a method of cutting a DC component caused by the gravity, there is a method of inserting a high-pass filter to thereby cut a DC component.

Here, description will specifically be made of the influence on which the detection of parallel vibration the gravity acceleration has.

Figure 9A:
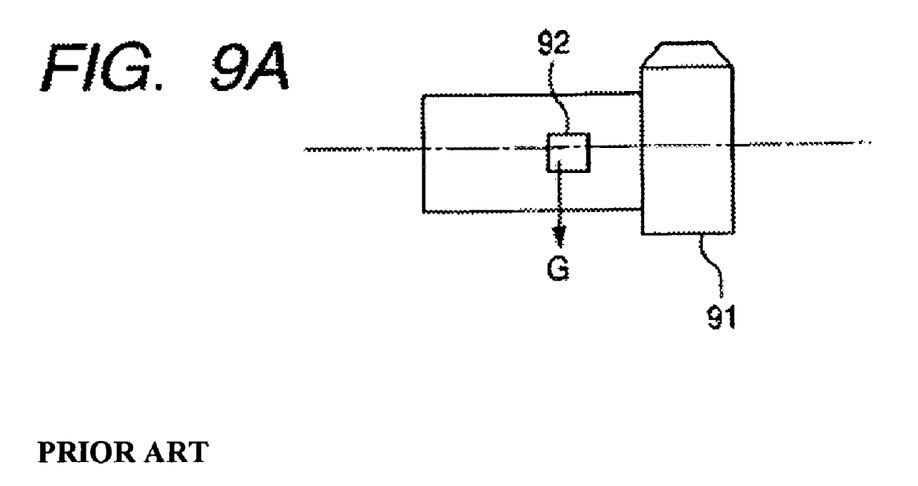
FIGS. 9A and 9B are views for illustrating the influence of a gravity acceleration received by an acceleration sensor in the system of Prior Art and the present invention.

In a state as shown, for example, in FIG. 9A the accompanying drawings wherein a conventional camera is leveled at a regular position, an acceleration sensor 92 outputs a signal corresponding to the gravity acceleration G.

When parallel vibration is to be detected, this gravity acceleration component is cut by a high-pass filter (HPF) and integration is effected twice (two integrations), whereby parallel vibration displacement can be calculated.

Figure 9B:
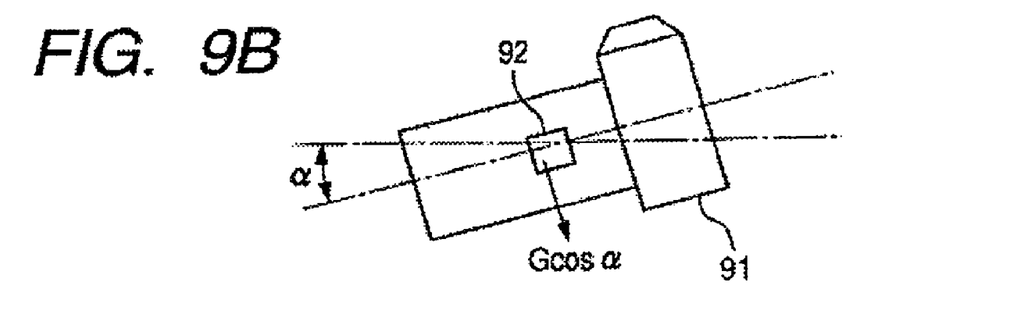

However, when as shown in FIG. 9B of the accompanying drawings, the camera is inclined at an angle α from the regular position, the gravity acceleration component of the acceleration sensor 92 changes from G to G cos α.

This amount of change is also cut by the HPF, but the HPF has the characteristic that it must detect a hand shake component and therefore, it is necessary to set the cut-off frequency to a low level (e.g. 0.05 Hz).

Accordingly, in the conventional camera, when a DC component caused by gravity acceleration has changed, a long time is required until the amount of change is completely cut and an output signal becomes stable. As the result, the accuracy of the correction of image blur may be lowered.

SUMMARY OF THE INVENTION

So, it is the object of the present invention to provide an image pickup apparatus and a lens-interchangeable camera system which quickly effect the stabilization of a parallel vibration detection signal during a framing change, and which are also effective for vibration correction during macro-photographing.

In order to achieve the above object, the present invention is characterized in that the filter characteristic of the signal processing of parallel vibration detecting means (e.g. an acceleration sensor) is changed in conformity with the output signal of rotation vibration detecting means (e.g. an angular velocity sensor).

Thereby, any change in the gravity acceleration component of the acceleration sensor due to a change in framing can be quickly eliminated, and the stabilization of the parallel vibration detection signal can be effected quickly. As the result, accurate image blur correction can be accomplished.

The above and other objects, features, and advantages of the invention will become more apparent from the following detailed description taken in conjunction with the accompany drawings.

DESCRIPTION OF THE PREFERRED EMBODIMENTS

Some preferred embodiments of the present invention will hereinafter be described in detail with reference to the drawings.

First Embodiment

Figure 1:
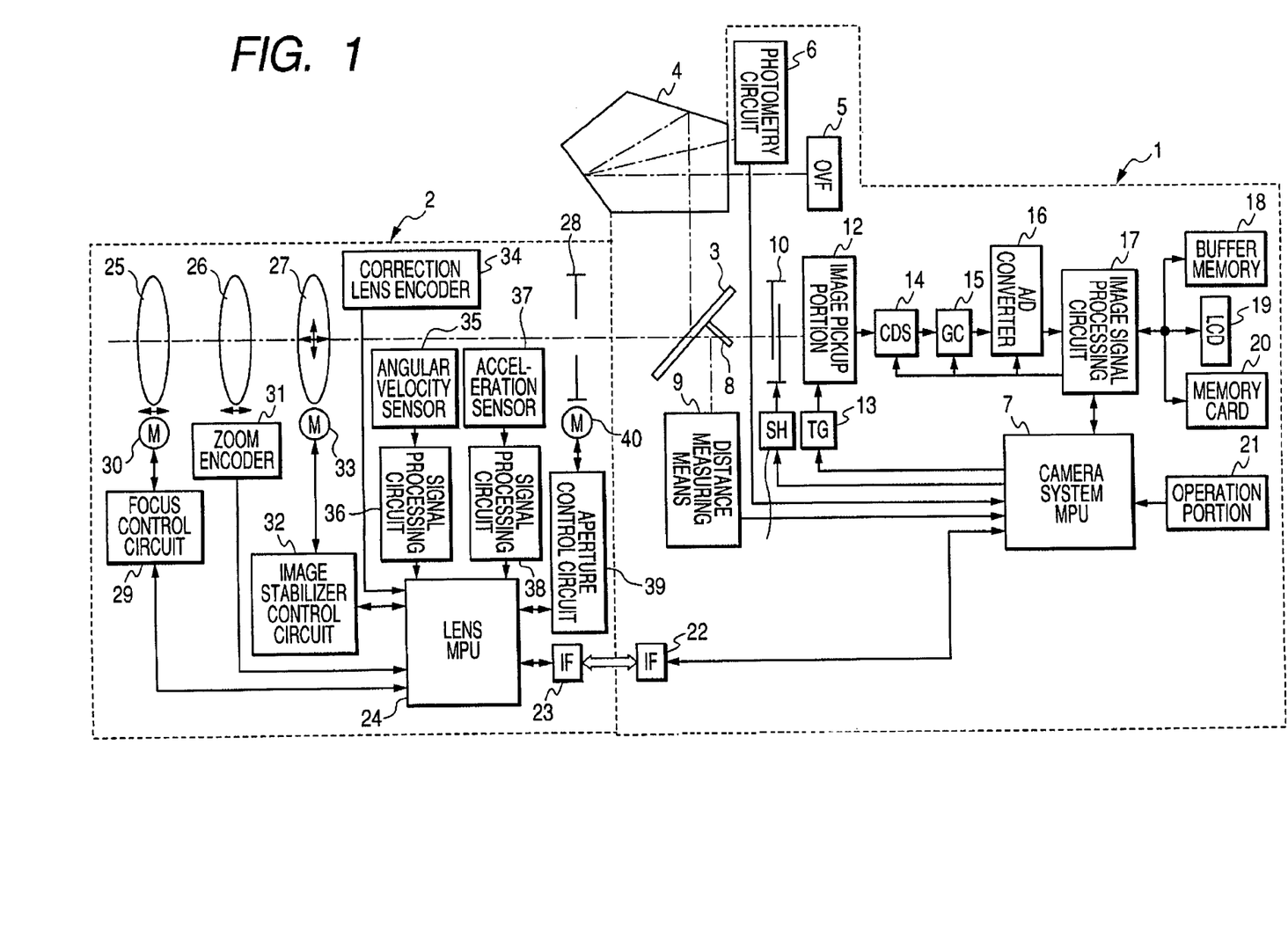
FIG. 1 is a block diagram showing the construction of a camera system according to an embodiment of the present invention.

FIG. 1 shows a camera system comprising a camera main body 1 and an interchangeable lens 2.

A photographing light beam from an object to be photographed passes through the photo-taking optical system of the interchangeable lens 2, and a part thereof is reflected by the quick return main mirror 3 of the camera main body 1 of which the central portion provides a half mirror during the preparation for photographing.

Thereafter, the light beam becomes an erect image in a penta-prism 4, and a photographer can confirm it as an object image through an optical viewfinder (OVF) 5.

Also, the reference numeral 6 designates a photometry circuit which measures the illuminance on the surface of a focusing plate, not shown, and inputs the result of the measurement to a camera system control MPU 7.

On the basis of the result of the aforementioned measurement, photographing conditions such as an exposure time and an aperture are determined by the camera system control MPU 7.

A photometry sensor in the photometry circuit 6 is divided into a plurality of areas, and can obtain the result of photometry by each area.

The reference numeral 8 denotes a sub-mirror which is disposed on the back of the quick return main mirror 3.

The sub-mirror 8 performs the function of causing the light beam passed through the half mirror surface of the quick return main mirror 3 to be incident on distance measuring means 9.

The distance measuring means 9 photoelectrically converts and signal-processes the incident light beam and inputs it to the camera system control MPU 7.

When the photographing operation is entered, the quick return main mirror 3 and the sub-mirror 8 are retracted to the penta-prism 4 side.

A focal plane shutter 10 is driven by a shutter driving circuit 11, and the photographing light beam is imaged on the surface of an image pickup portion (CCD or CMOS) 12. Then, the photographed optical image is photoelectrically converted into an image pickup signal.

Also, the reference numeral 13 designates a timing generator which controls the accumulating operation, reading-out operation, resetting operation, etc. of the image pickup portion 12.

The reference numeral 14 denotes a CDS circuit (dual correlation sampling circuit) which reduces the accumulated charge noise of the image pickup portion 12, the reference numeral 15 designates a gain control circuit which amplifies the image pickup signal, and the reference numeral 16 denotes an A/D converter which converts the amplified image pickup signal from an analog signal to a digital signal.

The reference numeral 17 designates an image signal processing circuit which effects filter processing, color conversion processing, gamma processing, etc. on digitized image data.

The signal-processed image signal is stored into a buffer memory 18, is displayed on an LCD 19, and is recorded on a detachably mountable memory card 20.

An operation portion 21 includes switches for effecting the setting of the photographing mode of the camera, the setting of a recorded image file size, and release and photographing.

The camera system control MPU 7 is for controlling the above-described operations of the camera main body 1.

It mutually communicates with a lens MPU 24 through an interface circuit 22 on the camera main body 1 side and an interface circuit 23 on the interchangeable lens 2 side.

It transmits a focus drive command, and transmits and receives data such as the operating states and optical information of the interiors of the camera main body 1 and the interchangeable lens 2.

A focusing lens 25, a zoom lens 26, an image blur correcting lens 27 and an aperture 28 are disposed as portions of the photo-taking optical system in the interchangeable lens 2.

The focusing lens 25 is driven by a control signal from the lens MPU 24 through a focus control circuit 29 and a focusing lens driving motor 30.

In the focus control circuit 28, there are included, besides a focusing lens driving circuit, a focus encoder which outputs a zone pattern signal and a pulse signal conforming to the movement of the focusing lens, etc. The object distance can be detected by this focus encoder.

The zoom lens 26 is moved by the photographer operating a zoom operation ring, not shown.

The zoom encoder 31 outputs a zone pattern signal conforming to the movement of the zoom lens.

The lens MPU 24 reads the signals from the focus encoder and a zoom encoder 31, and reads out photographed image magnification data stored in advance by a combination of the object distance and the focal length, whereby a photographed image magnification is obtained.

The image blur correcting lens 27 is driven through an image blur correction control circuit 32 and a linear motor 33.

The vibration signals of an angular velocity sensor 35 for detecting rotation vibration and an acceleration sensor 37 for detecting parallel vibration are signal-processed by signal processing circuits 36 and 38, respectively.

The signal-processed vibration signals are inputted to the lens MPU 24.

A correcting lens drive target signal is calculated by the lens MPU 24, a correcting lens position signal outputted from a correcting lens encoder 34 is fed back, and a driving signal is outputted to the image blur correction control circuit 32. In this manner, image blur correction is effected.

The aperture 28 is driven by a control signal from the lens MPU 24 through an aperture control circuit 39 and a stepping motor 40.

Here, the detailed processing from after the signals of the angular velocity sensor 35 and the acceleration sensor 37 have been signal-processed by the lens MPU 24 through the signal processing circuits 36 and 38 until rotation vibration and parallel vibration are obtained will be described with reference to the block diagram of FIG. 2.

The output signal of the acceleration sensor 37 includes therein a parallel vibration acceleration component, a gravity acceleration component by the posture of the camera, and a gravity acceleration change component by rotation vibration.

The gravity acceleration component by the posture of the camera and an offset component are eliminated by an analog high-pass filter 41, and a predetermined times (K1) of signal amplification is effected by an amplifying circuit 42.

Thereafter, the aforementioned output signal is A/D-converted into a digital signal by an A/D converter 43 in the lens MPU 24.

Then, processing by a digital high-pass filter 44 is effected, whereafter the gravity acceleration change component by the rotation vibration calculated from an angular displacement signal which will be described later is eliminated, and a parallel vibration acceleration component is extracted. Thereafter, integration processing is effected twice by integrators 45 and 46, whereby a parallel vibration displacement signal S is obtained.

Also, the output signal of the angular velocity sensor 35 has its offset component eliminated by an analog high-pass filter 47. Thereafter, a predetermined times (K2) of signal amplification is effected by an amplifying circuit 49, and the aforementioned output signal is A/D-converted into a digital signal by an A/D converter 49 in the lens MPU 24.

Then, signal processing by a digital high-pass filter 50 and an integrator 51 is effected, and a rotation vibration angular displacement signal θ is obtained.

Also, this rotation vibration angular displacement signal θ is multiplied by a gain K3 to thereby calculate the gravity acceleration change component by the rotation vibration, and it is subtracted from the output of the high-pass filter 44, as previously described, to thereby eliminate the gravity acceleration change component by the rotation vibration.

However, the gravity acceleration change component eliminated here is only an gravity acceleration change caused by the rotation vibration.

Accordingly, a DC-like gravity acceleration change by the change of framing (change in the posture of the camera) is eliminated by the high-pass filter 44.

Figure 3:
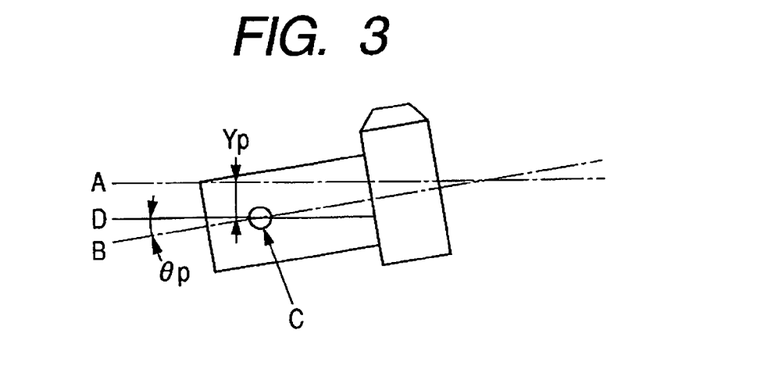
FIG. 3 is an illustration of parallel vibration and rotation vibration in the system of FIG. 1.

FIG. 3 is a view for illuminating the parallel vibration and the rotation vibration. For simplification, only the vibrations in a longitudinal direction are shown.

In FIG. 3, when the photo-taking optical system is moved from a line A to a line B by the photographer's hand shake, the distance Yp between a line D passing through the front side principal point C of the photo-taking optical system and parallel to the line A becomes parallel vibration.

Also, the angle formed by and between the line B and the line D becomes rotation vibration.

The image blur displacement Ysp on the imaging plane by the parallel vibration Yp is as follows:

$$Ysp = Yp \cdot \beta \qquad \text{(expression 1)}$$

where β is the photographed image magnification.

If the acceleration sensor 37 for parallel vibration detection is disposed near the front side principal point, the calculation of the parallel vibration Yp can be more simplified.

Also, the image blur displacement Yrp on the imaging plane by the rotation vibration θp is as follows:

$$Yrp = f(1+\beta)\tan\theta p, \qquad \text{(expression 2)}$$

where f is the focal length, and the term (1+β) is a term representative of an apparent change in the focal length by the focusing of a whole pay-away type lens. In the case of a partial pay-away type lens, it follows a correction expression inherent to each lens.

The rotation vibration and the parallel vibration are detected, and the image blur correcting lens 27 is driven so as to negate the above-mentioned image blur, whereby even during close-up photographing in which the photographing distance is short, the accuracy of image blur correction can be improved.

Figure 4:
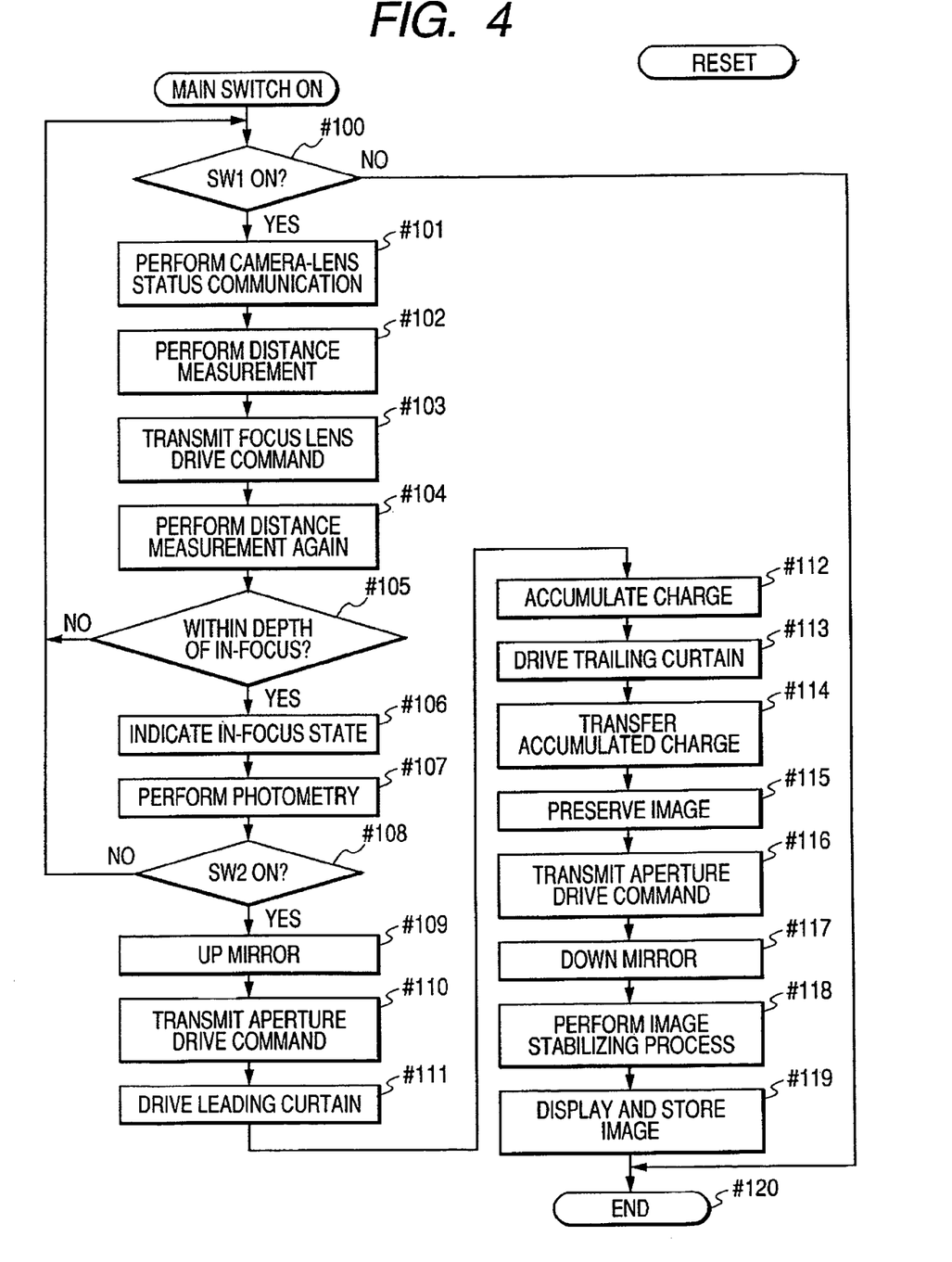
FIG. 4 is a flow chart showing the operation of a camera main body in the system of FIG. 1.

The photographing operation of the camera main body 1 side (camera system MPU 7) will now be described with reference to a flow chart shown in FIG. 4.

When on the camera main body 1 side, a main switch is rendered on, the operation starts from a step 100.

(Step 100) Whether a release switch in the operation portion 21 of the camera main body 1 has been half-depressed (SW1ON) is judged.

If it is half-depressed, advance is made to a step 101, and if it is not half-depressed, advance is made to a step 120, and the processing here is terminated.

(Step 101) Camera-lens status communication is effected with the lens MPU 24 through the interface circuits 22 and 23.

Here, the status of the camera (the status SW1ON of the release switch, the photographing mode, shutter speed, etc.) is transmitted to the lens, and the status of the lens (the focal length, the status of the aperture, the driven state of the focusing lens, etc.) is received.

While in the flow chart of the present embodiment, this camera-lens status communication is shown about its main portions only, it is effected at any time when the status of the camera has changed, or when the camera desires to confirm the status of the lens.

(Step 102) Since the release switch has been half-depressed (SW1ON), distance measurement is effected by the distance measuring means 9, and a focusing lens drive amount for focusing the lens on the object to be photographed is calculated.

(Step 103) The focusing lens drive amount is transmitted to the interchangeable lens 2. This data is transmitted, for example, as the drive target pulse amount of the focus encoder.

(Step 104) When the focusing lens drive is terminated, distance measurement is performed again.

(Step 105) Whether the lens is within the depth of in-focus is judged, and if it is within the depth of in-focus, advance is made to a step 106.

(Step 106) Since the lens is within the depth of in-focus, the display of the in-focus is effected. This is done by turning on an LED in the optical viewfinder 5 of the camera main body 1, or producing a sound.

(Step 107) The result of photometry (brightness) from the photometry circuit 6 is obtained to thereby calculate the exposure time Tv and the aperture value (the amount of aperture driving).

(Step 108) Whether the release switch in the operation portion 21 of the camera main body 1 has been fully depressed (SW2ON) is judged. When it has been fully depressed, advance is made to a step 109.

(Step 109) The quick return main mirror 3 is upped. At this time, the sub-mirror 8 is also driven to the penta-prism 4 side together with the main mirror 3.

(Step 110) The amount of aperture driving obtained at the step 107 is transmitted to the interchangeable lens 2 to thereby perform the driving of the aperture 28.

(Step 111) A leading curtain is driven.

(Step 112) The object image is exposed to the image pickup portion 12 and charges are accumulated.

(Step 113) When the exposure time has elapsed, a trailing curtain is driven to thereby terminate the exposure.

(Step 114) Charge transfer (reading-out) from the image pickup portion 12 is performed.

(Step 115) The read-out photographed image signal is converted into digital data via the CDS circuit 14, the gain control circuit 15 and the A/D converter 16, and is preserved in the buffer memory 18.

(Step 116) An aperture opening command is transmitted to the interchangeable lens 2 to thereby open the aperture 28.

(Step 117) The quick return main mirror 3 and the sub-mirror 8 are downed.

(Step 118) Image correcting processes such as gamma correction and a compressing process are performed.

(Step 119) The image data subjected to the image correcting processes is displayed on the LCD 19 and also is recorded on the memory card 20, and a series of operations until photographing are ended.

The operation of the interchangeable lens 2 side (lens MPU 24) will now be described with reference to flow charts shown in FIGS. 5, 6 and 7.

Figure 5:
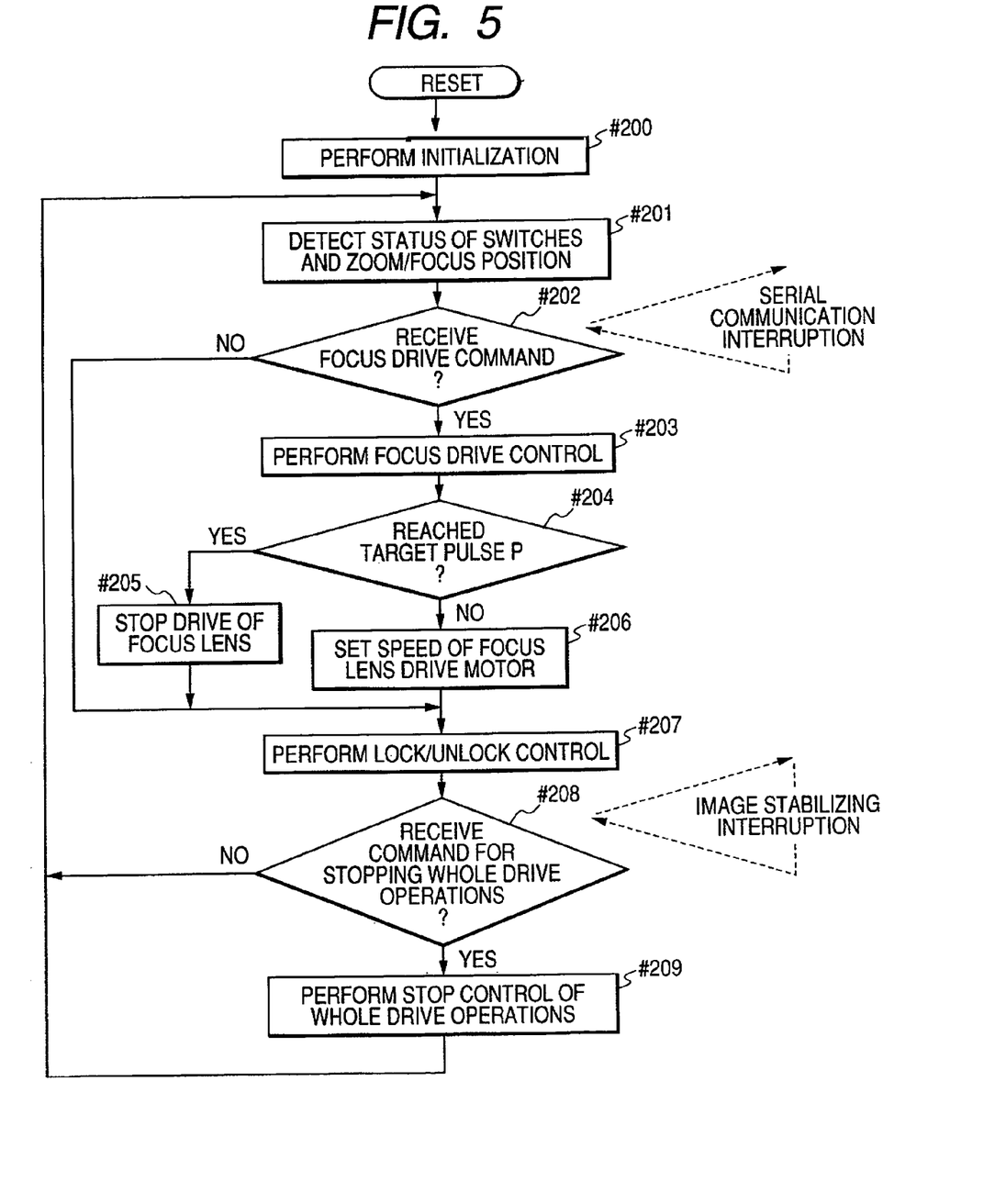
FIG. 5 is a flow chart showing the operation of an interchangeable lens in the system of FIG. 1.
Figure 6:
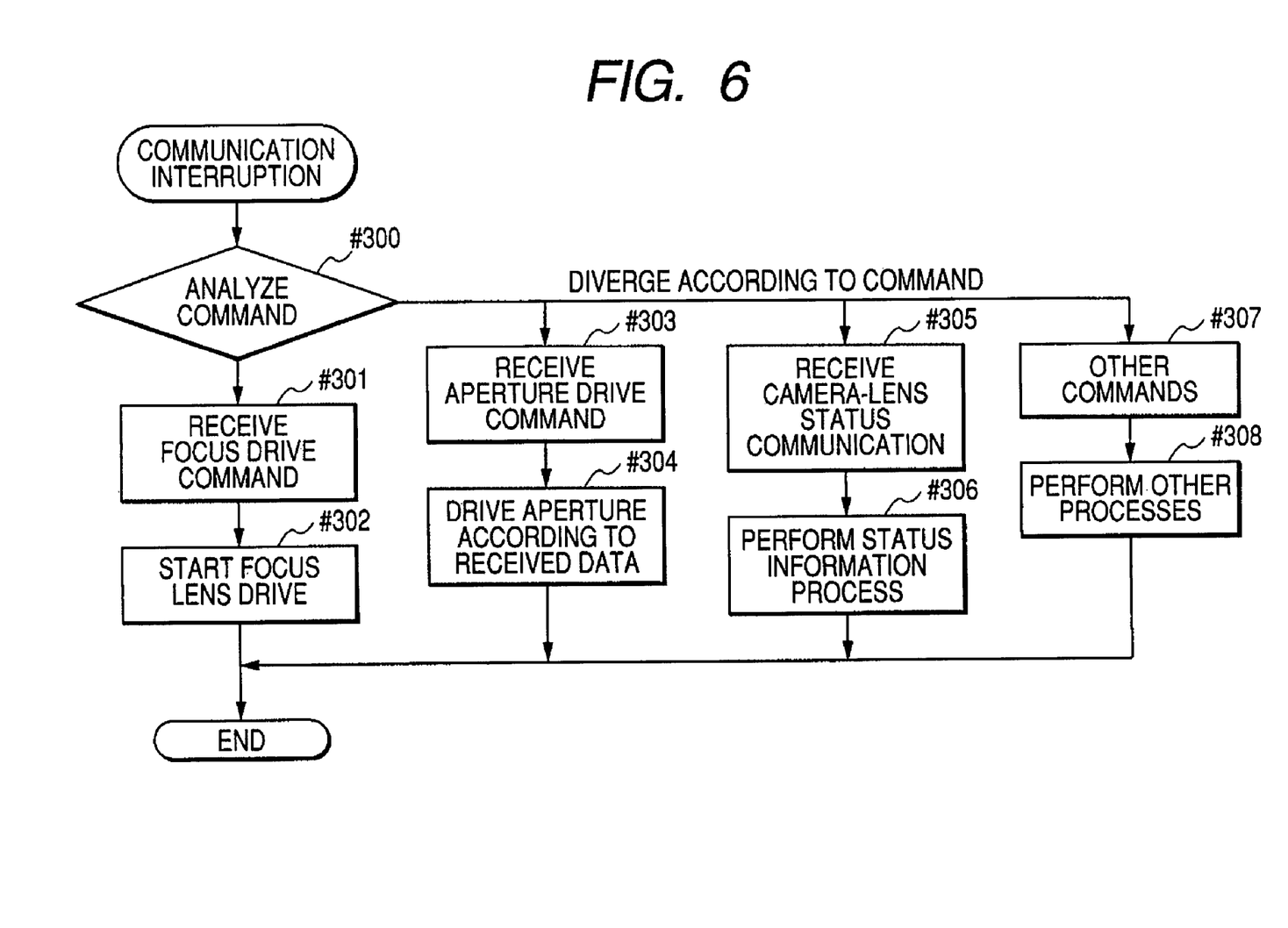
FIG. 6 is a flow chart showing the operation of the interchangeable lens in the system of FIG. 1.

When the lens is mounted on the camera, serial communication is done from the camera to the lens, and the operation is started from the step 200 of FIG. 5.

(Step 200) Initial setting for lens control and image blur correction control is performed.

(Step 201) The detection of the status of the switches, not shown, and the detection of the position of the zoom focus are performed.

The switches are, for example, a changeover switch for auto focusing and manual focusing, an ON/OFF switch having an image blur correcting function, etc.

(Step 202) Whether there has been a focus drive command from the camera is judged. If the focus drive command has been received, advance is made to a step 203, and if it has not been received, advance is made to a step 207.

(Step 203) In the focus drive command communication from the camera, the target drive amount (pulse number) of the focusing lens is also transmitted and therefore, the pulse number of the focus encoder in the focus control circuit 29 is detected to thereby perform focus drive control so as to drive the focusing lens by a target pulse number.

(Step 204) Whether the target pulse number P has been reached is judged. If the target has been reached, advance is made to a step 205, and if the target has not been reached, advance is made to a step 206.

(Step 205) Since the target pulse number has been reached, the driving of the focusing lens is stopped.

(Step 206) Since the target pulse number has not been reached, the speed setting of the focusing lens driving motor 29 is performed in conformity with the remaining drive pulse number. As the remaining drive pulse number becomes smaller, the speed of the motor 29 is attenuated.

(Step 207) If at the step 201, the OFF of the image blur correcting function ON/OFF switch has been detected, the image blur correcting lens 26 is locked about the optical axis thereof.

If the ON has been detected and the release switch SW1ON of the camera has been detected by the camera-lens status communication, the lock is released (unlocked) to thereby bring about a state in which the image blur correcting operation can be performed.

(Step 208) Whether a command for stopping the whole drive (stopping the whole drive of the actuator in the lens) has been received from the camera is judged.

If no operation is performed on the camera side, this command for stopping the whole drive is transmitted from the camera in a while.

(Step 209) Whole drive stopping control is performed. Here, the whole actuator drive is stopped to thereby bring a microcomputer into a sleeping (stopped) state.

Electric power supply to the image blur correcting device is also stopped.

Thereafter, when some operation is performed on the camera side, the camera sends communication to the lens to thereby release the sleeping state.

If during these operations, there is a demand for serial communication interruption and image blur correction control interruption by the communication from the camera, those interruption processes are performed.

As regards the serial communication interruption process, the decoding of communication data is effected and in conformity with the result of the decoding, lens processing such as, for example, aperture driving and focusing lens driving is performed.

By the decoding of the communication data, SW1ON, SW2ON, the shutter speed, the kind of the camera, etc. can also be discriminated.

Also, the image blur correction interruption is timer interruption occurring at each predetermined cycle, and image blur correction control in a pitch direction (longitudinal direction) and a yaw direction (lateral direction) is effected.

First, the serial communication interruption will be described with reference to the flow chart of FIG. 6.

When it receives the communication from the camera, the lens MPU 24 starts an operation from a step 300.

At the step 300, it analyzes a command from the camera, and diverges to processing conforming to each command.

At a step 301, it receives a focus drive command and therefore, at a step 302, it executes the setting of the speed of the focusing lens driving motor 30 in conformity with a target drive pulse number, and starts focusing lens drive.

At a step 303, it receives an aperture drive command and therefore, drives the aperture 28 on the basis of the transmitted aperture drive data.

At a step 304, it sets the driving pattern of the stepping motor 40, and outputs the set driving pattern to the stepping motor 40 through the aperture control circuit 39 to thereby drive the aperture 28.

At a step 305, it receives camera-lens status communication and therefore, at step 306, it transmits the focal length information, IS operation state, etc. of the lens to the camera. Also, it receives the status of the camera (such as the status of the release switch, the photographing mode and the shutter speed).

At a step 307, it receives other commands, and at a step 308, it performs processes such as the focus sensitivity data communication of the lens, and lens optical data communication.

The image blur correction interruption will now be described with reference to the flow chart of FIG. 7.

Figure 7:
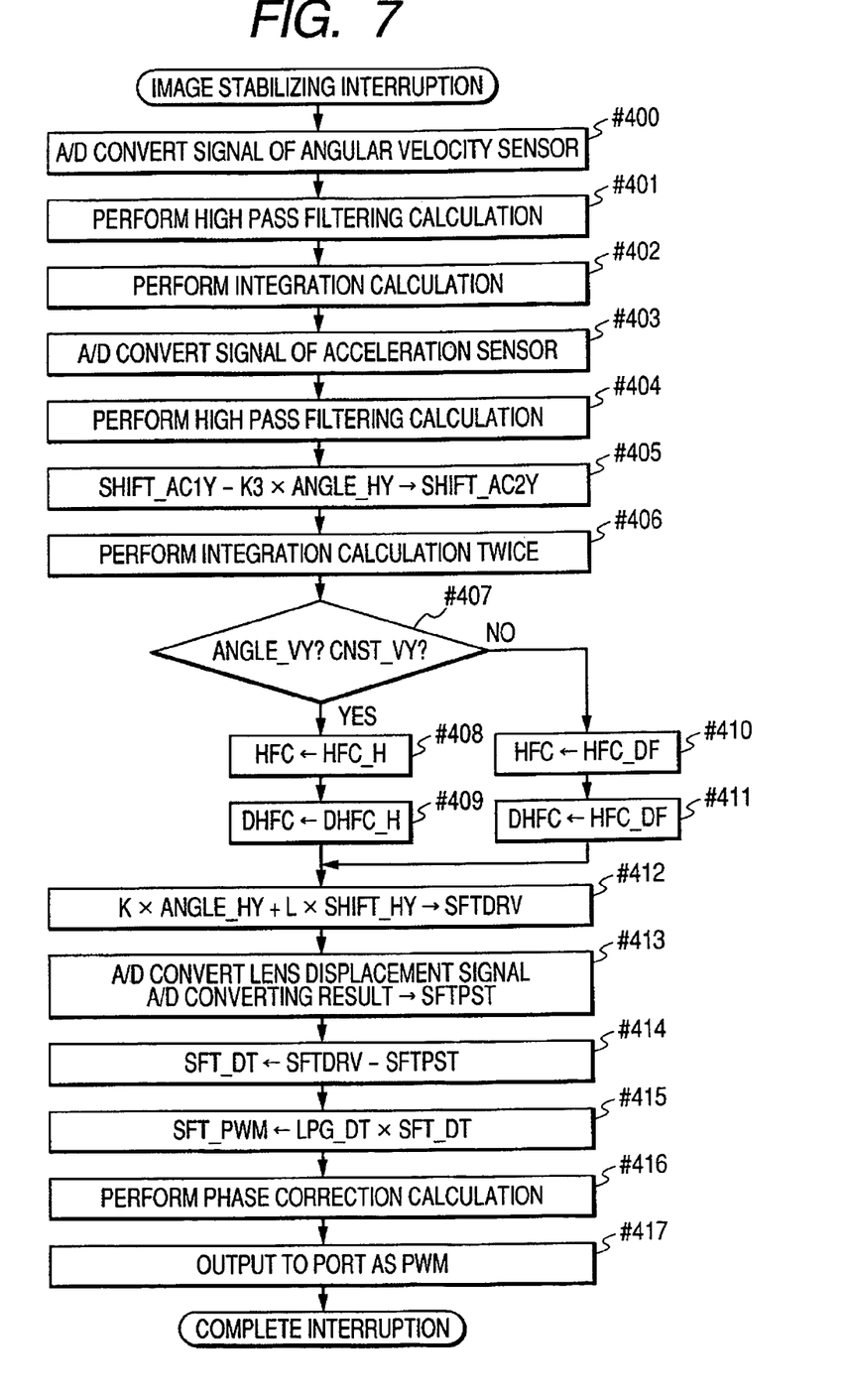
FIG. 7 is a flow chart showing an image blur correcting operation in the system of FIG. 1.

When the image blur correction interruption occurs during the main operation of the lens, the lens MPU 24 starts the control of the image blur correction from the step 400 of FIG. 7.

Figure 2:
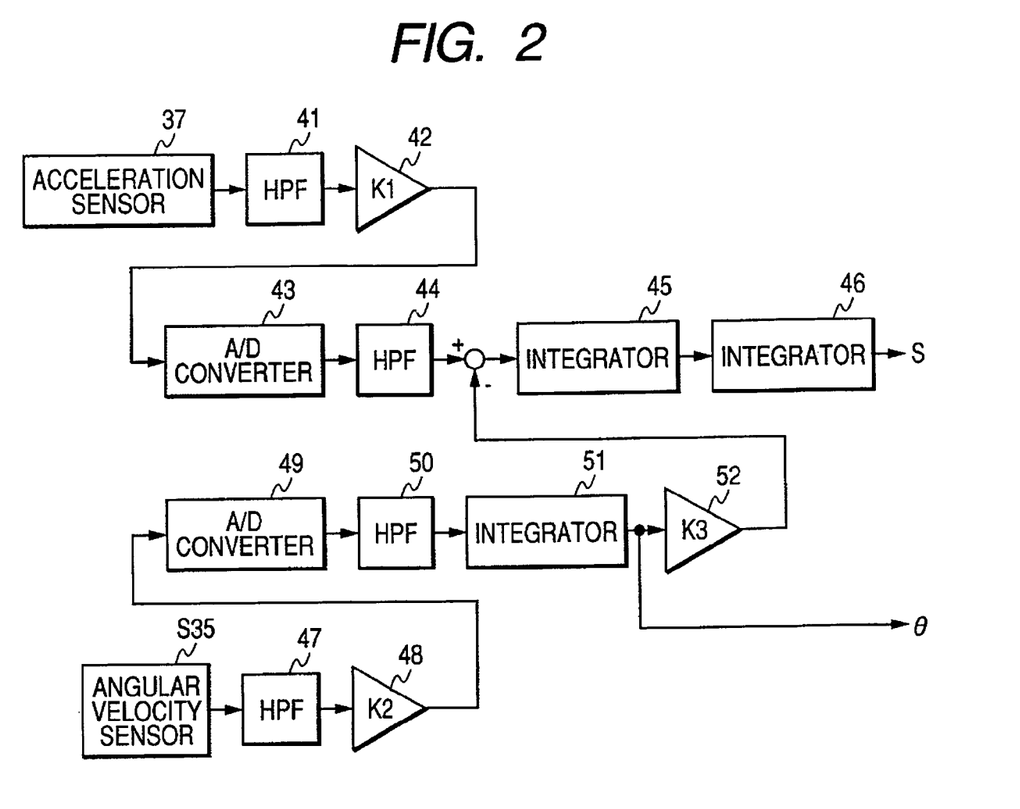
FIG. 2 is a block diagram showing the signal processing of parallel vibration detecting means and rotation vibration detecting means in the system of FIG. 1.

(Step 400) It A/D-converts an output signal obtained by the signal of the angular velocity sensor 35 being processed by the signal processing circuit 36 (the high-pass filter 47 and the amplifying process 48 in FIG. 2).

(Step 401) It performs high-pass filter calculation (the high-pass filter 50 in FIG. 2) to cut a low-frequency component. For a predetermined time from the start of the calculation, it performs the changeover of the time constant of the high-pass filter, and also performs an operation for quickly stabilizing the signal. The result of this calculation is stored in a RAM area, not shown, set by ANGLE_VY in the lens MPU 24.

(Step 402) It performs integration calculation with the result of the calculation by the high-pass filter 50 as an input.

This result is angular displacement data, and is stored in a RAM area, not shown, set by ANGLE_HY in the lens MPU 24.

(Step 403) It A/D-converts an output signal obtained by the signal of the acceleration sensor 37 being processed by the signal processing circuit 38 (the high-pass filter 41 and the amplifying process 42 in FIG. 2).

(Step 404) It performs high-pass filter calculation (the high-pass filter 44 in FIG. 2) to cut a low-frequency component. This high-pass filter calculation is the high-pass filter characteristic of a cut-off frequency DHFC set at a step 409 or a step 411 which will be described later. Also, for a predetermined time from the start of the calculation, it performs the changeover of the time constant of the high-pass filter, and also performs an operation for quickly stabilizing the signal. The result of this calculation is stored in a RAM area, not shown, set by SHIFT_AC1Y in the lens MPU 24.

(Step 405) A result obtained by multiplying the angular displacement data ANGLE_HY obtained at the step 402 by a gain K3 is subtracted from SHIFT_ACIY, to thereby eliminate an gravity acceleration change caused by the rotation vibration. The result of this calculation is parallel vibration speed data, and is stored in a RAM area, not shown, set by SHIFT-AC2Y in the lens MPU 24.

(Step 406) It performs integration calculation twice with SHIFT_AC2Y as an input. The result of this calculation is parallel vibration displacement data, and is stored in a RAM area, not shown, set by SHIFT-HY in the lens MPU 24.

(Step 407) Whether the high-pass filter calculation result ANGLE_VY of the step 401 is greater than a predetermined value CNST_VY is judged. If it is greater than the predetermined value CNST_VY, it is judged that the framing has been changed, and advance is made to a step 408.

(Step 408) At the step 407, the high-pass filter calculation result ANGLE_VY is greater than the predetermined value CNST_VY and therefore, it is judged that the framing has been changed, and the cut-off frequency HFC of the high-pass filter 41 is set to a high frequency side HFC_H.

(Step 409) The cut-off frequency DHFC of the high-pass filter 44 in FIG. 2 is set to a high frequency side DHFC_H. Thereby, the cut-off frequency DHFC of the high-pass filter calculation at the step 404 in the next image blur correction interruption becomes the characteristic of the high frequency side DHFC_H.

(Step 410) At the step 407, the high-pass filter calculation result ANGLE_VY is smaller than the predetermined value CNST_VY and therefore, the cut-off frequency HFC of the high-pass filter 41 is set to an ordinary frequency HFC_DF (lower frequency side than HFC_H).

If in the last image blur correction interruption, the cut-off frequency HFC was HFC_H, it is judged that the change of the framing has ended, and there is assumed the operation of returning HFC_H to the ordinary frequency HFC_DF.

(Step 411) The cut-off frequency DHFC of the high-pass filter 44 in FIG. 2 is set to an ordinary frequency DHFC_DF (lower frequency side than DHFC_H).

Thereby, the cut-off frequency DHFC of the high-pass filter calculation at the step 404 in the next image blur correction interruption becomes the characteristic of the ordinary frequency DHFC_DF.

Here, the change of the cut-off frequency of the analog high-pass filter 41 will be specifically described.

Figure 10:
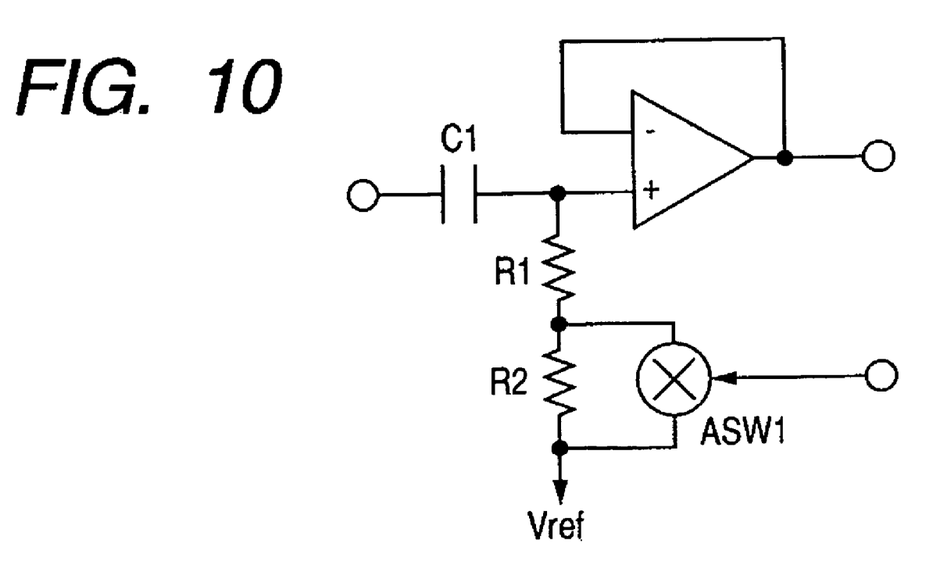
FIG. 10 is a circuit diagram showing a specific example of a high-pass filter in the system of FIG. 1.

The analog high-pass filter 41, if it is a circuit shown, for example, in FIG. 10, can effect the change of the cut-off frequency thereof by an analog switch ASW1 being ON/OFF-controlled by the output port, not shown, of the lens MPU 24.

When the cut-off frequency HFC is set to a high frequency side HFC_H, the analog switch ASW1 is rendered ON, and when it is set to the ordinary frequency HFC_DF, the analog switch ASW1 is rendered OFF.

(Step 412) The amount of eccentricity of the image blur correcting lens 27 for correcting the image blur due to the rotation vibration angular displacement ANGLE_HY and the parallel vibration displacement SHIFT_HY is changed by the focus position and the zoom position and therefore, the adjustment thereof is effected.

Specifically, eccentricity amount adjustment data K for correcting the rotation vibration angular displacement ANGLE_HY and eccentricity amount adjustment data L for correcting the parallel vibration displacement SHIFT_HY, from the signals of the zoom encoder 31 and the focus encoder, are read out from table data, and are converted into correcting lens drive data.

The result of the calculation is stored in a RAM area, not shown, set by SFTDRV in the lens MPU 24.

(Step 413) The signal of the correcting lens encoder 34 which detects the amount of eccentricity of the image blur correcting lens 27 is A/D-converted, and the result of the A/D conversion is stored in a RAM area set VY SFTPST in the lens MPU 24.

(Step 414) Feedback calculation (SFTDRV_SFTPST) is effected. The result of the calculation is stored in a RAM area set by SFT_DT in the lens MPU 24.

(Step 415) A loop gain LPG_DT is multiplied by the calculation result SFT_D of the step 414.

The result of the calculation is stored in a RAM area set by SFT_PWM in the lens MPU 24.

(Step 416) Phase correction calculation is performed to make a stable control system.

(Step 417) The result of the calculation at the step 416 is outputted as PWM to the port of the lens MPU 24, and the image blur correction interruption is completed.

The output is inputted to the driver circuit in the IS control circuit 32, and the image blur correcting lens 27 is driven by the linear motor 33, whereby the correction of image blur is performed.

As described above, when at the step 407 to the step 411 in FIG. 7, the rotation vibration angular velocity signal assumes a predetermined value or greater, the interchangeable lens 2 heightens the cut-off frequency of the high-pass filter of the acceleration sensor signal processing portion for parallel vibration detection.

Thereby, any change in the gravity acceleration component of the acceleration sensor by the change of the framing can be quickly eliminated and the stabilization of the parallel vibration detection signal can be quickly accomplished and as the result, accurate image blur correction can be performed.

While in the present embodiment, the level of the angular velocity signal which is the reference for changing over the cut-off frequency of the high-pass filter for the acceleration sensor signal processing is set to one, it is possible to set a plurality of levels and change over them to thereby effect finer image blur correction control.

Also, while in the present embodiment, the level of the rotation vibration signal which is the reference for changing over the cut-off frequency of the high-pass filter for the acceleration sensor signal processing is used as the level of the angular velocity signal, use may be made of the level of an angular displacement signal.

Second Embodiment

A second embodiment of the present invention will now be described in detail. The construction of this embodiment is similar to that of the first embodiment shown in FIG. 1, and need not be described.

In the second embodiment, when the photographed image magnification β is smaller than a predetermined value, the cut-off frequency of the high-pass filter for the acceleration sensor signal processing is not changed.

When β is a predetermined value or greater, the cut-off frequency of the high-pass filter of the acceleration sensor signal processing portion for parallel vibration detection is heightened in conformity with the level of the rotation vibration angular velocity signal.

The operation of the interchangeable lens 2 side will now be described with reference to a flow chart shown in FIG. 8.

The operation of main portions are shown at steps 501 to 503, and the operations of the other portions are similar to those in the first embodiment and therefore, are given the same step numbers are those in the first embodiment and need not be described.

(Step 501) Prestored photographed image magnification data β is read out from the signals of the focus encoder and the zoom encoder 31, and whether the photographed image magnification β is 0.3 time or greater is judged.

If β is 0.3 time or greater, advance is made to a step 407, and if not so, advance is made to a step 502.

(Step 502) At the step 501, the photographed image magnification β was smaller than 0.3 time and therefore, the cut-off frequency HFC of the high-pass filter 41 (FIG. 2) is set to HFC_M (higher frequency side than HFC_D).

If the photographed image magnification is small, the influence on the photographed image the parallel vibration has becomes small and therefore, it is better to reduce the characteristic of a low frequency and cut the fluctuation of a signal of the low frequency.

(Step 503) The cut-off frequency DHFC of the high-pass filter 44 in FIG. 2 is set to DHFC_M (higher frequency side than DHFC_DF).

If the photographed image magnification is small, the influence on the photographed image the parallel vibration has becomes small and therefore, it is better to reduce the characteristic of the low frequency and cut the fluctuation of a signal of the low frequency.

Figure 8:
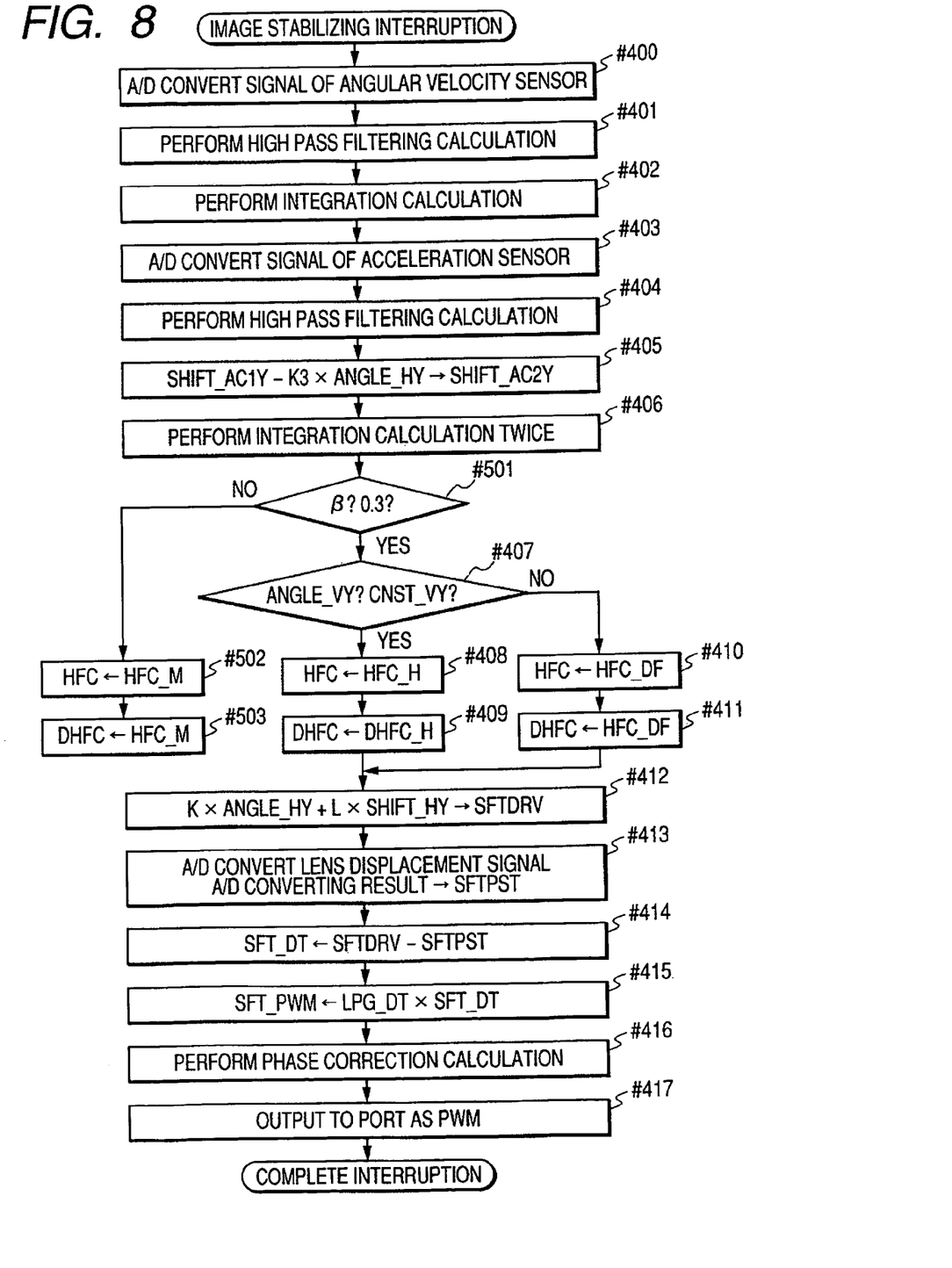
FIG. 8 is a flow chart showing the image blur correcting operation in the system of FIG. 1.

As described above, when at the step 501 to the step 503 and the step 407 to the step 411 in FIG. 8, the photographed image magnification β is smaller than the predetermined value, the interchangeable lens 2 does not change the cut-off frequency of the high-pass filter for the acceleration sensor signal processing.

When β is the predetermined value or greater, the cut-off frequency of the high-pass filter of the acceleration sensor signal processing portion for parallel vibration detection is heightened in conformity with the level of the rotation vibration angular velocity signal.

By doing so, even in the case of a photographed image magnification at which parallel vibration is liable to have influence on the photographed image, it is possible to quickly eliminate any change in the gravity acceleration component of the acceleration sensor due to the change of the framing, and quickly accomplish the stabilization of the parallel vibration detection signal.

As the result, accurate image blur correction can be performed.

While in the present embodiment, the photographed image magnification is calculated from the focal length (zoom position) and the object distance (focus position). In the case of a single-focus lens, an operation similar to that described above may be performed in conformity with the object distance.

Also, while in the above-described embodiments, there has been shown an example in which an acceleration sensor is applied as the parallel vibration detecting means, the image pickup element of the camera main body may be applied.

Also, while in the above-described embodiments, there has been shown an example in which when the rotation vibration angular velocity signal has assumed a predetermined value or greater, the cut-off frequencies of both of the analog high-pass filter and digital high-pass filter of the acceleration sensor signal processing portion for parallel vibration detection are heightened, one of the cut-off frequencies may be changed.

Also, while in the above-described embodiments, there has been shown an example in which the present invention is applied to the interchangeable lens of a digital single lens reflex camera system, the present invention may also be applied to a silver salt camera, a compact camera, a video camera or the like.

As many apparently widely different embodiments of the present invention can be made without departing from the sprit and scope thereof, it is to be understood that the invention is not limited to the specific embodiment thereof except as defined in the appended claims.

This application claims priority from Japanese Patent Application No. 2005-019976 filed Jan. 27, 2005, which is hereby incorporated by reference herein.

What is claimed is:

1. An optical apparatus having:
   parallel vibration detecting means for detecting vibration in a direction parallel or perpendicular to the optical axis of an image pickup optical system;
   rotation vibration detecting means for detecting rotation vibration about the optical axis of the image pickup optical system or about an axis perpendicular to the optical axis;
   parallel vibration signal processing means for filter-processing the output signal of said parallel vibration detecting means;
   rotation vibration signal processing means for filter-processing the output signal of said rotation vibration detecting means; and
   signal processing control means for changing the filter characteristic of said parallel vibration signal processing means in conformity with the output signal of said rotation vibration signal processing means.

2. An optical apparatus according to claim 1, wherein said signal processing control means changes the filter characteristic of said parallel vibration signal processing means when the output signal of said rotation vibration detecting means assumes a predetermined value or greater.

3. An optical apparatus according to claim 2, wherein said signal processing control means changes the cut-off frequency of the filter characteristic of said parallel vibration processing means to a high frequency side when the output signal of said rotation vibration detecting means assumes the predetermined value or greater.

4. An optical apparatus according to claim 1, further having photographed image magnification detecting means for detecting a photographed image magnification, and wherein said signal processing control means further changes the filter characteristic of said parallel vibration signal processing means in conformity with the result of detection by said photographed image magnification detecting means.

5. An optical apparatus according to claim 4, wherein said signal processing control means changes the filter characteristic of said parallel vibration signal processing means when the result of detection by said photographed image magnification detecting means is a predetermined magnification or greater, and the output signal of said rotation vibration detecting means assumes a predetermined value or greater.

6. An optical apparatus according to claim 5, wherein said signal processing control means changes the cut-off frequency of the filter characteristic of said parallel vibration signal processing means to a high frequency side when the result of detection by said photographed image magnification detecting means is a predetermined magnification or greater, and the output signal of said rotation vibration detecting means assumes the predetermined value or greater.

7. An optical apparatus according to claim 4, wherein said photographed image magnification detecting means detects a photographed image magnification on the basis of the information of at least one of an object distance and a focal length.

8. An optical apparatus according to claim 1, further having image blur correcting means for driving a lens on the basis of the output signal of said parallel vibration signal processing means and the output signal of said rotation vibration signal processing means to thereby correct image blur.

9. An optical apparatus according to claim 1, wherein said parallel vibration detecting means is an acceleration sensor.

10. An optical apparatus according to claim 1, wherein said rotation vibration detecting means is an angular velocity sensor.

11. An optical apparatus according to claim 1, which includes an interchangeable lens and a camera main body on which the interchangeable lens is detachably mountable.

12. An optical apparatus according to claim 4, further having image blur correcting means for driving a lens on the basis of the output signal of said parallel vibration signal processing means and the output signal of said rotation vibration signal processing means to thereby correct image blur.

* * * * *